(12) United States Patent
Sommerwerk et al.

(10) Patent No.: US 10,785,268 B2
(45) Date of Patent: Sep. 22, 2020

(54) PRESENTING MEDIA DATA TO COMMUNICATION CLIENTS IN THE COURSE OF A COMMUNICATION DATA EXCHANGE

(71) Applicants: T-Mobile Polska S.A., Warsaw (PL); SoundCall GmbH, Berlin (DE); Deutsche Telekom AG, Bonn (DE)

(72) Inventors: Andreas Sommerwerk, Berlin (DE); Krzysztof Mioduszewski, Bialystok (PL); Piotr Mikolaj Karas, Warsaw (PL); Grzegorz Sikora, Ksiazenice (PL); Dominik Skrobacz, Cracow (PL)

(73) Assignees: NOISY UNIT GMBH, Berlin (DE); DEUTSCHE TELEKOM AG, Bonn (DE)

( * ) Notice: Subject to any disclaimer, the term of this patent is extended or adjusted under 35 U.S.C. 154(b) by 626 days.

(21) Appl. No.: 14/580,278

(22) Filed: Dec. 23, 2014

(65) Prior Publication Data

US 2015/0188954 A1 Jul. 2, 2015

(30) Foreign Application Priority Data

Dec. 30, 2013 (EP) .................................. 13461568

(51) Int. Cl.
| | |
|---|---|
| *H04L 29/06* | (2006.01) |
| *H04M 1/725* | (2006.01) |
| *H04L 29/08* | (2006.01) |
| *H04W 12/06* | (2009.01) |
| *H04M 7/00* | (2006.01) |

(Continued)

(52) U.S. Cl.
CPC ...... *H04L 65/1083* (2013.01); *H04L 65/1016* (2013.01); *H04L 65/60* (2013.01); *H04L 67/141* (2013.01); *H04M 1/72527* (2013.01); *H04M 3/487* (2013.01); *H04M 7/0024* (2013.01); *H04W 4/50* (2018.02); *H04W 12/06* (2013.01); *H04M 2203/352* (2013.01)

(58) Field of Classification Search
CPC ........ H04W 12/06; H04W 12/12; H04L 63/08
USPC .......................... 455/411, 414.1, 422.1, 410
See application file for complete search history.

(56) References Cited

U.S. PATENT DOCUMENTS

| | | |
|---|---|---|
| 6,683,938 B1 | 1/2004 | Henderson |
| 6,859,779 B2 | 2/2005 | Yokoyama |
| 7,512,219 B2 | 3/2009 | Kovales et al. |

(Continued)

*Primary Examiner* — Nghi H Ly
(74) *Attorney, Agent, or Firm* — Leydig, Voit & Mayer, Ltd.

(57) ABSTRACT

A system for presenting media data to communication clients in the course of a communication data exchange between the communication clients in a telecommunication network includes: a storage engine, configured to store a plurality of media data files; an application control server, configured to receive media data file selection signals from at least one of the communication clients in the course of the communication data exchange, and to select media data files from the storage engine based on the received media data file section signals; and a communication processing server, configured to exchange media data with the communication clients and to retrieve the selected media data files from the storage engine, for simultaneously presenting the retrieved media data files at the communication clients in the course of said communication data exchange.

11 Claims, 6 Drawing Sheets

(51) Int. Cl.
*H04M 3/487* (2006.01)
*H04W 4/50* (2018.01)

(56) References Cited

U.S. PATENT DOCUMENTS

| | | | |
|---|---|---|---|
| 7,973,818 B2 | 7/2011 | Agrawal | |
| 8,966,034 B1* | 2/2015 | Paczkowski | H04W 8/18 |
| | | | 455/435.2 |
| 2002/0114322 A1* | 8/2002 | Xu | H04L 29/06027 |
| | | | 370/352 |
| 2005/0059434 A1 | 3/2005 | Hong | |
| 2006/0174026 A1* | 8/2006 | Robinson | H04N 7/17336 |
| | | | 709/231 |
| 2007/0021145 A1 | 1/2007 | Lam | |
| 2011/0238494 A1* | 9/2011 | Park | G06Q 30/02 |
| | | | 705/14.46 |

* cited by examiner

PRESENTING MEDIA DATA TO COMMUNICATION CLIENTS IN THE COURSE OF A COMMUNICATION DATA EXCHANGE

CROSS-REFERENCE TO RELATED APPLICATIONS

Priority is claimed to European Patent Application No. EP13461568, filed on Dec. 30, 2013, the entire disclosure of which is hereby incorporated by reference herein.

FIELD

The present invention relates to telecommunications systems and, more particularly, to the presentation of media data to communication clients in the course of a communication data exchange, such as the presentation of audio data during a telephone call.

BACKGROUND

Communication clients or user equipment in telecommunications systems, in particular wireless telecommunications systems, provide a plurality of communication options, such as voice communication, video communication, Short Message Service, SMS, Multimedia Messaging Service, MMS, emails and the like. Voice communication, that is telephony, still is the most widely used basic type of communication between users of both mobile and fixed or landline telecommunication systems.

The content of a communication data exchange between communication clients depends on the data produced and transmitted by either client. In a telephone call, for example, the data content generally is a voice conversation between the users. In a video call, the voice conversation is enhanced by image content, generally the faces of the respective users. Text communication, like SMS, may be enhanced by so-called emoticons available on the communication client of a user, for example.

Unless a user is creative in designing his/her own audio or sound, video or other image content, it is in general difficult or quite a challenge to enrich an on-going communication data exchange with other content than naturally produced by any of the users themselves, thereby creating added value to the communication data exchange.

Attempts are known in the prior art to provide injection of audio or sound into a voice call. For example, U.S. Pat. No. 7,512,219 discloses sound to be injected via a standard conference system, wherein the called user may reject the sound. This document refers to a voice mail messaging system that provides the sounds or the sounds may be stored at and send from the telephone of the caller.

In US patent publication no. US2005/059434 and U.S. Pat. No. 7,973,818 the sounds intended for injection are stored in a mobile phone. US patent publication no. US2007/0021145 discloses a user interface for selecting sounds that are stored in a mobile telephone.

U.S. Pat. No. 6,859,779 relates to coding/encoding problems and loss of quality if sounds are injected to a voice call through speech decoders/encoders. The document discloses a multiplexer that mixes the encoded digital speech data and the digital sound data. Mixing is carried out in the mobile telephone.

U.S. Pat. No. 6,683,938 discloses processing and storage in a central database of audio files or sounds to be injected in a telephone call in accordance with user preferences for the sounds to be injected. That is, the sounds to be injected are associated with stored predefined user preferences. U.S. Pat. No. 6,683,938 lacks versatility for the parties to the call in controlling and selecting sounds to be injected during the call.

SUMMARY

In an embodiment, the invention provides a system for presenting media data to communication clients in the course of a communication data exchange between the communication clients in a telecommunication network. The system includes: a storage engine, configured to store a plurality of media data files; an application control server, configured to receive media data file selection signals from at least one of the communication clients in the course of the communication data exchange, and to select media data files from the storage engine based on the received media data file section signals; and a communication processing server, configured to exchange media data with the communication clients and to retrieve the selected media data files from the storage engine, for simultaneously presenting the retrieved media data files at the communication clients in the course of said communication data exchange.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
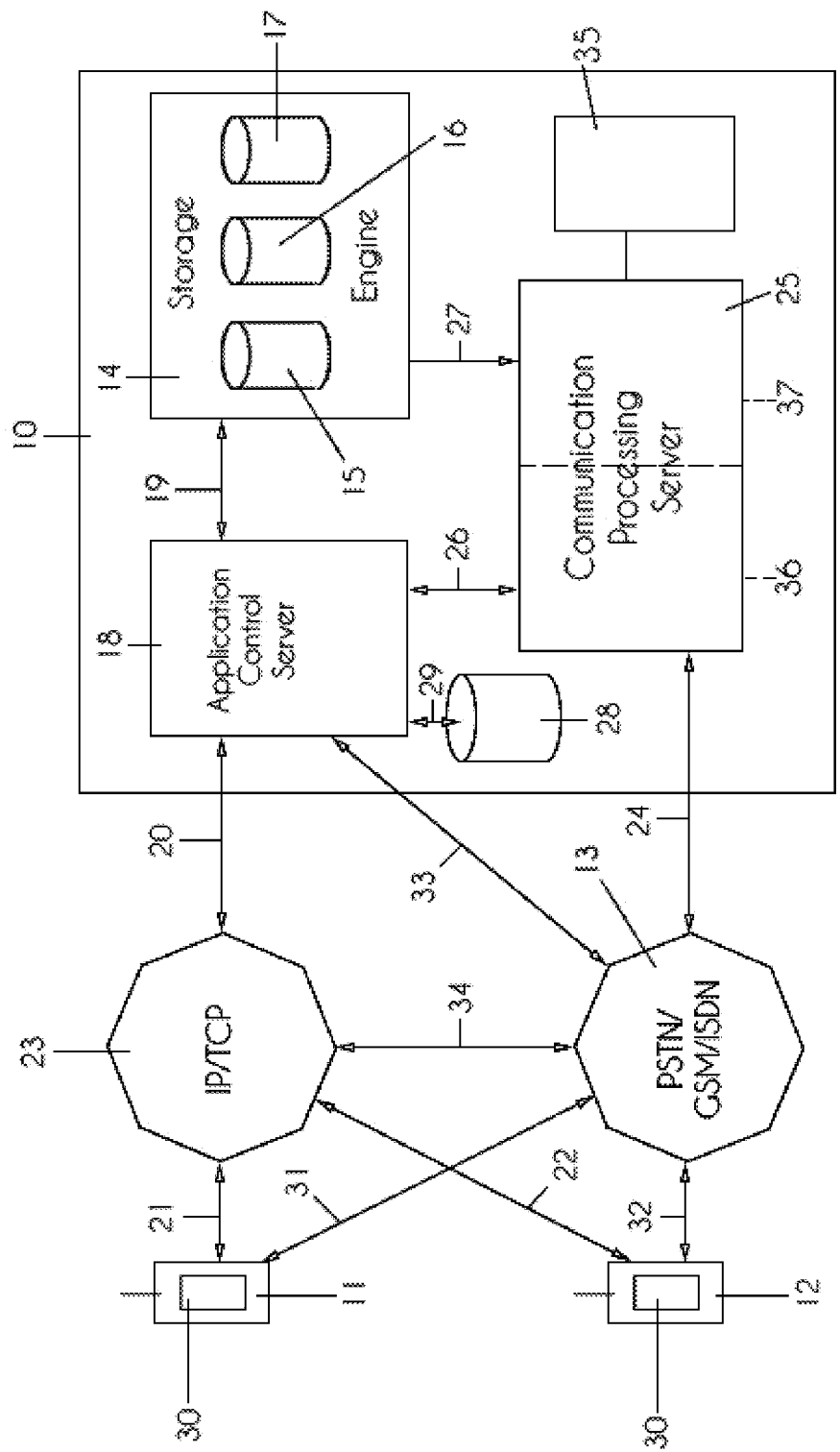
FIG. 1 is an example of schematic high-level view of a system for presenting media data to a first communication client and a second communication client in the course of a communication data exchange in a telecommunication network in accordance with the principles of the present invention.

The present invention provides a versatile system and method for providing communication clients involved in a data communication exchange the possibility of enriching their data communication exchange with content other than preselected by a communication client or available at a communication client or produced by a user thereof.

In a first aspect, the invention provides a system for presenting media data to communication clients in the course of a communication data exchange between these communication clients in a telecommunication network, the system comprising:
- a storage engine storing a plurality of media data files,
- an application control server, arranged for receiving media data file selection signals from at least one of the communication clients in the course of the communication data exchange, and for selecting media data files from the storage engine based on the received media data file section signals, and
- a communication processing server, arranged for exchanging media data with the communication clients and for retrieving the selected media data files from the storage engine, for simultaneously presenting the retrieved media data files at the communication clients in the course of the communication data exchange.

The system provides that a communication client, in the course of the communication data exchange, through the application control server, may dynamically select a media data file from a plurality of media data files stored in the storage engine. Once selected, the media data file is presented, by the communication processing server, to the communication clients simultaneously. That is, in the present invention, a communication client is not restricted to a particular predetermined selection of media data and may alter its selection during the communication data exchange dependent on, for example, the momentary content of the communication data exchange. The system is thereby much more versatile in the selection of media data for enriching a data communication exchange compared to the prior art mentioned above.

In particular in a real-time communication data exchange, such as a telephone and/or video call, for example, it is desired that both communication clients receive selected media data content during the communication as much as possible at the same time, i.e. simultaneously. By presenting the selected media data files through a dedicated communication processing server, set-up and latency times in the actual presentation of the media data files at a communication client, which are inherent to data communication through a telecommunication network, can be effectively controlled such that the communication clients receive the selected media content at the same point of time in their conversation or other type of communication data exchange. The term simultaneously when used in the present description and claims has to be understood as indicating that a selected media data file is as much as possible presented to the communication clients at the same point in time.

Communication clients like modern smartphones and mobile telecommunication networks of the so-called third and fourth generation, for example, support data exchange over several communication channels. While selected media data files may be presented to the communication clients involved in a communication data exchange over data channels other than used for the actual communication data exchange, in an embodiment of the system, the communication processing server is arranged for exchanging the communication data between the communication clients and for inserting the retrieved media data files in this communication data exchange, i.e. at the data channel used for the communication data exchange between the communication clients.

Routing, i.e. exchanging, the communication data of the communication clients through a dedicated communication processing server, provides an efficient implementation for the presentation of selected media content to the communication clients simultaneously, independently whether the initial communication between the communication clients is a packet or circuit switched data exchange. As the selected media content is directly inserted in, i.e. mixed with, the communication data exchange between the communication clients, no additional communication resources or channels of the telecommunications network are required.

In a further embodiment, in order to use available processing power and communication resources of the communication processing server as efficient as possible, the communication processing server is arranged for exchanging the communication data between the communication clients during insertion of the retrieved media data files in the communication data exchange. That is, only for the time that the retrieved media data content is to be exchanged with both communication clients, the communication data exchange is routed through the communication processing server.

The selection and presentation of media data files to communication clients in the course of a communication data exchange may be implemented as a particular service to which communication clients may subscribe to, for example.

In a practical implementation of the system according to the invention, the communication data exchange between clients may be a voice call, which is routed via the communication processing server selectively. That is, the Public Land Mobile Network, PLMN, or Public Switched Telephone Network, PSTN, which is handling the communication, for example, is arranged for rerouting towards the communication processing server and anchoring there only calls of communication clients who have an active subscription of the service. This is based on adequate provisioning mechanisms of a user subscription to the service implemented towards the network at service activation and deactivation as well as call rerouting mechanisms that are based on this subscription information.

To provide the selection and presentation of media data files as a particular service to a communication client, and/or for cost charging and billing purposes, in another embodiment of the system according to the invention, the system is arranged for provisioning registration and authentication of communication clients, and for enabling processing of any of media data file related control data, metadata, and media data file selection signals, in the course of a communication data exchange between the communication clients, if at least one of the communication clients is a registered and authenticated communication client.

Registration and authentication of communication clients may further enable selection of media data files for originating communication clients only, for terminating clients only, or for both originating and terminating communication clients. In telephony terminology generally indicated as calling, called, or calling and called user equipment, respectively.

The system may be advantageously arranged for a first time only registration of a communications client. Authentication may be provided by passwords and suitable encryption facilities, for example.

In an embodiment of the system according to the invention, the registration and authentication data of communication clients may be stored in a register or storage of the telecommunication system accessible by a switching entity, node or server of the telecommunication system, and wherein the switching entity, node or server is arranged for interrogating this register or storage and retrieving applicable registration and authentication data for routing the communication data exchange between the first and second communication clients through the communication processing server using dedicated service key values and corresponding communication client subscriber number prefixes.

The registration and authentication data may be stored in a dedicated database controlled by the system according to the invention, such as controlled by the application control server and/or by including appropriate registration and/or subscription data in a register or storage of or operatively connected to the telecommunication network supporting or involved in the communication data exchange, such as a Home Location Register, HLR, a Flexible Number Register, FNR, a Number Portability Data Base, NPDB, a Mobile Application Protocol, MAP, proxy or serving server database, and the like.

The term metadata refers to descriptive information of a particular media data file, such as title, artist, duration, category and type of the media data file, and other information. Control data may include, for example, the point in time to start and/or stop the play of the retrieved media data, whether to play the media data as background sound, etc.

In a preferred embodiment of the system according invention, the application control server is arranged for exchanging media data file related control data and metadata, inclusive the media data file selection signals, with at least one of the communication clients using an Internet Protocol, IP, enabled communication channel.

An IP control channel facilitates a versatile and relatively easy to implement user interface at a communication client, in particular by dedicated media data application software, nowadays generally called an "app", supporting the exchange of data with the application control server. Representational State Transfer, REST, architecture may be advantageously used in designing the communication protocol between a communication client and the application control server, providing an efficient and less resource intensive data exchange.

In an embodiment of the system according to the invention, the media data files stored in the storage engine are categorized, and the application control server is arranged for selecting the media data files from the storage engine based on the received media data file section signals in accordance with a category of the media data files.

By categorization, for example, one may avoid playing at the same time several background media data files, such as sounds during a telephone call, or incompatible media data files, whereas it should be possible to play together a background sound and a short applause or laughing, for example. The category of media data files may determine, for example, whether same may be played together or not.

In a further embodiment of the system according to the invention, the application control server is arranged for exchanging media data file related control data and metadata, including the media data file selection signals, with a dedicated media data application of a communication client, wherein the media data application is arranged for generating media data file selection signals from an analysis of data exchanged during the data communication.

Instead of or in addition to a manual selection of a media data file by the user of a communication client, the invention, in this further embodiment, facilitates an automatic presentation of media data to the communication clients based on the actual content of the data exchanged. That is, for example, in a telephone call conversation when detecting, by the media data application, the sound of laughing, a selection signal may be generated and provided to the application control server to automatically select a media data file comprising content that enhances or supports the laughing.

It will be appreciated that for privacy reasons, the media data application may be restricted to analyse data produced and/or transmitted by the communication client at which the media data application is operative. Suitable data analysis software as such, for the purpose of the invention, is commercially available.

Communication data analysis may, however, also be performed on the network side. A communication processing server using commercially available Automatic Speech Recognition, ASR, software modules could perform such analysis and, based on the outcome of the analysis, may perform additional actions during the course of the communication and media data exchange.

During a telephone call conversation, for example, a speech recognition module may detect a certain keyword or set of keywords used by a participant of the call, i.e. a communication client, query a system for information and inject a media data file resulting from the query into the conversation. For example, during the conversation one of the parties could speak a phrase like 'weather San Francisco now', this phrase may trigger the communication processing server to query an external service for the weather forecast for San Francisco, and the result of this query would be converted to one or more media data files using Text To Speech, TTS, technology and be presented to the communication clients or participants in the call, for example.

The application control server and storage engine, in an embodiment of the invention, may be common for a plurality of different telecommunication networks or telecommunication network operators, and the communication processing server may be comprised by a plurality of communication servers arranged with and dedicated to a different telecommunication network or a telecommunication network operator premises. Such a common application control server and storage engine is in particular advantageous for the purpose of efficiently maintaining and renewing the content of the media data files and related metadata.

To avoid delays in the presentation of media data files by a transfer of retrieved media data file content from a central or common storage engine to a decentralized or local communication processing server, in an embodiment of the system of the invention a telecommunication network or telecommunication network operator comprises a storage engine arranged with and dedicated to the telecommunication network or telecommunication network operator premises comprising a replica of the commonly provided storage engine, wherein the commonly provided storage engine and dedicated storage engines are arranged for automatically replicating media data files.

The automatic replication of storage engines may be effected during off peak hours of a telecommunication network, for example at night, thereby avoiding use of scarce data transmission resources during busy hours.

In a preferred embodiment of the invention, the storage engine, application control server and communication processing server are arranged for operating in accordance with an Internet protocol Multimedia Subsystem, IMS, communication platform.

IMS is a standardised architecture for telecommunication operators for providing mobile and fixed multimedia services to their subscribers. IMS may operate as an overlay network for existing mobile and fixed telecommunications networks. The term "overlay" entails that a communication data exchange established in a first telecommunications network, such as a Public Land Mobile Network, PLMN, operating under the Global System for Mobile communications, GSM, standard, for example, is processed by, i.e. "overlayed" to, the IMS network to provide to the communication clients multimedia telecommunications services, such as Internet, Voice-over-IP, VoIP, and many other existing and future services. IMS merges the Internet with the cellular world. IMS provides network operators and service providers the ability to control and charge for individual services. In addition, users will be able to execute all their services when roaming as well as from their home networks. IMS uses open standard IP protocols. Moreover, the interfaces for service developers are also based on IP protocols.

In a second aspect, the invention provides a telecommunication network arranged for selective routing of incoming and outgoing communication data exchange to a communication processing server of the system, based on subscription information of communication clients for presenting media data files in the course of a communication data exchange between the communication clients in the telecommunication network.

In a practical implementation of the system according to the invention for operating in an IMS communication platform, the communication processing server is comprised of two parts or components. That is a media server part handling the media traffic and arranged for operating in accordance with a Media Resource Function, MRF, and a call control server part, i.e. an Application Server, AS, generally handling the signalling traffic such as when anchoring a call at setup.

The MRF is a standardized functionality in IMS providing media related functions to manage and process media streams such as voice, video, text-to-speech, and real-time transcoding of multimedia data. An MRF is normally only involved when an IMS application requires to provide a media service from the network such as playing announcements or mixing media streams in a multiparty conference and is normally only involved for the duration of the media service.

The AS is an element which handles Session Initiation Protocol, SIP, signalling traffic and is responsible for executing service logic. The AS part of the communication processing server may be a central node on the call setup path which controls both call legs and acts as Back to Back User Agent, B2BUA. The AS part of communication processing server receives media data file selection signals from the application control server and, based thereon, incorporates MRF into media data traffic path. Those skilled in the art will appreciate that such a separation of signalling and media traffic will allow to efficiently use MRF processing resources.

In practical implementations of the method using an IMS communication platform, the invention provides for selective routing of a communication data exchange originated by a communication client being a subscriber of the particular service and/or communication terminated by a subscriber of the service towards the call control server part, i.e. the AS, of the communication processing server. Such communication data exchange is anchored in the call control server part enabling the AS to perform the desired subscribed service, such as sound injection, within the ongoing communication data exchange. The selective routing is performed based on a dedicated subscription data, which at the activation of the service is provisioned to relevant network databases, that are accessible by the switching entity.

Assume the methods for selective routing are implemented in the context of a cellular mobile network telecommunication environment and in the context of audio or sound injection logic of the communication processing server.

Certain characteristics of this selective routing of calls via the AS, i.e. the call control server part of the communication processing server, may be summarized as follows (the term mobile refers to mobile User Equipment, UE):

the routing solution enables redirection of Mobile Originating, MO, Mobile Terminating, MT, and Call Forwarding, CF, calls to the AS based on a sound injection subscription provisioned in the network databases and applied on a per user basis;

the subscription and call handling logic for MO calls is independent from that for MT calls. MO subscription and handling applies also for CF cases;

the sound injection subscription and call redirection logic may be applied to any subscriber and does not require the subscriber to use specific Mobile Station Integrated Services Digital Network, MSISDN, and/or International Mobile Subscriber Identity, IMSI, ranges;

the routing solution enables to maintain all other services that are available for the user before and after activation of the sound injection service. Specifically, it assures: proper Intelligent Network, IN, service invocation; proper charging/billing, both for off-line and on-line charged subscribers;

redirection of call-related signalling only—non-call related signalling such as SMS is not redirected/affected;

the routing solution enables backup mechanisms that allow failover between a primary and a backup AS as well as successful call setup on Core Network, CN, side in case of unavailability of both primary and backup servers; of course failure of all ASs implies dropping of ongoing calls anchored there;

the routing solution options on CN side are generic, comprising integration with AS over SIP signalling messages via an IMS Media Gateway Control Function, MGCF, but same subscription and redirection logic may be applied to other integration options between CS and AS, such as ISDN User Part, ISUP, based.

As already mentioned the sound injection service enables a subscriber to inject selected sounds during an ongoing conversation. This capability may be activated by a network operator (service provider) for its own users as a dedicated subscription to the service. Sound injection capability applies to both the calls originated and terminated by the subscriber, i.e. MO and MT calls, respectively. Based on the sound injection subscription, the solution on Circuit Switched, CS, CN side redirects MO and MT calls to the AS in order to anchor the call there and enable the AS to execute sound injection logic. In fact, initially only signalling for the redirected calls is send to the AS and anchored there and the media data are redirected at the moment of first sound injection within a given call in order to minimize media server load. Such setup is possible, for example, in case of integration over SIP protocol. Of course, redirecting the media from the start is also possible. Such setup would be used also in case of integration over ISUP, for example.

The subscription and logic for handling of MO and MT calls is independent from technical perspective. Only MO subscription, only MT subscription or both may be applied. In a preferred implementation activation of the sound injection subscription is open jointly for both MO and MT calls. The MO subscription and handling applies also to CF cases. The CF case is visible for the AS based on redirection related data in the received signalling, for example the HistoryInfo header in case of a SIP INVITE message. If necessary, the sound injection for CF cases may be disabled in the AS logic based on correlation of MT and MO containing redirection related data, or in a UE application by enabling sound injection only during an active MO or MT call, for example.

MO call redirection logic is based on a specific subscription assigned to the sound injection user in the Home Location Register, HLR, or in an implementation variant in the Service Control Point, SCP, or the Signalling Transfer Point/Number Portability Data Base, STP/NPDB, server depending on the particular implementation variant. Redirection is executed in the Mobile Switching Center/Visitor Location Register, MSC/VLR, based on subscription downloaded from the HLR or based on an specific prefixing applied by SCP or STP/NPDB, depending on chosen implementation variant).

MT call redirection logic is based on a specific subscription assigned to the sound injection user in STP/NPDB/Mobile Application Part, MAP, proxy or alternatively in the HLR or SCP. The redirection is executed in MSC/VLR based on specific prefix returned by NPDB/MAPproxy, or alternatively by HLR or SCP.

Thus the calls from/to communication clients or users are selectively routed towards the AS based on users' active media data insertion subscription. Specific B-party number prefixing is used towards the AS to indicate and differentiate various traffic cases as may be required for call handling in the AS and in the CN.

In a third aspect, the invention provides a method of presenting media data to communication clients in the course of a communication data exchange between these communication clients in a telecommunication network, the method comprising the steps of:
  receiving, by an application control server, media data file selection signals from at least one of the communication clients in the course of the communication data exchange,
  selecting, by the application control server, media data files from a storage engine based on the received media data file section signals,
  retrieving, by a communication processing server, the selected media data files from the storage engine, and
  exchanging the retrieved media data files, by the communication processor, with the communication clients in the course of the communication data exchange, for simultaneously presenting the retrieved media data files at the communication clients.

The system or method according to the invention will find, in particular, application where the communication data exchange between the communication clients is a voice telephone call, and wherein the media data are audio data.

In a fourth aspect the invention provides a communication client, such as a fixed or mobile telephone or a smartphone, comprising data processing, transceiver and interface devices arranged for communication data exchange in a telecommunication network and comprising a dedicated media data application for exchanging media data file related control data and metadata, including media data file section signals, with the application control server of the system and method for presenting media data as disclosed above.

In a fifth aspect, there is provided a computer readable medium, having computer readable instructions stored thereon of a dedicated media data application, the instructions when executed on a data processing device of a communication client arranged for communication data exchange in a telecommunication network cause the communication client to operate for exchanging media data file related control data and metadata, including media data file section signals, with an application control server of the system and method for presenting media data in accordance with any of the embodiments disclosed above.

The computer readable medium may be any of a transitory medium, such as a downloadable data file or data signal and a non-transitory medium or data storage device such as a hard disk, Universal Serial Bus, USB, drive or stick, Digital Versatile Disc, DVD, Compact Disk, CD, media cards, and so on.

The above-mentioned and other features and advantages of the invention will be best understood from the following description, with reference to the enclosed drawings.

In the drawings, like reference numerals denote identical parts or parts performing an identical or comparable function or operation.

The present invention will be illustrated by way of example and not by way of limitation by embodiments wherein a communication data exchange, such as a voice communication, i.e. a telephone call, a video communication and/or data communication like a Short Message Service, SMS, or Multimedia Messaging Service, MMS, is enriched by media data to be presented to the communication clients involved in such communication data exchange.

FIG. 1 shows a system 10 in accordance with the invention for presenting media data to a first communication client 11 and a second communication client 12 in the course of a communication data exchange 31, 32 between these communication clients 11, 12 in a telecommunication network 13, such as a Public Switched Telephone Network, PSTN, an Integrated Services Digital Network, ISDN, a Public Land Mobile Network, PLMN, cellular mobile telephone network such as operating under the Global System for Mobile communications, GSM, General Packet Radio Service, GPRS, Universal Mobile Telecommunications System, UMTS, or any other fixed or mobile telecommunications standard or protocol, known to those skilled in the art. Although communication data exchange between two communication clients is disclosed, it will be appreciated that the invention may be equally applicable to a communication data exchange between more than two communication clients such as, for example, in a conference call involving three or more parties, i.e. communication clients.

As will be known to those skilled in the art, a communication client 11, 12 generally comprises transceiver and interface devices arranged for communication data exchange 31, 32 in the telecommunication network 13, such as RF transceiver devices for a wireless or mobile radio telephone, loudspeaker, microphone, keyboard and display devices, and a data processing device in the case of a modern smartphone or tablet, for example.

The system 10 comprises a storage engine 14 storing a plurality of media data files, such as sound files 15, video files 16, image files and other data files 17, and an application control server 18, operatively connected 19 to the storage engine 14 and arranged for selecting media data files 15, 16, 17 from the storage engine 14. The application control server 18 operatively connects to one or both of the communication clients 11, 12 via an intermediate data transmission network 23 and communication channels or interfaces 20, 21, 22 for receiving media data file selection signals from a communication client 11, 12 and for exchanging media data file related control data and/or metadata.

In the case of communication clients 11, 12 like modern mobile or wireless smartphones arranged for multimedia data processing and data exchange, the data transmission network 23 may be an Internet Protocol, IP, Transmission Control Protocol, TCP, enabled data transmission network 23 of the so-called third and fourth generation, for example, supporting data exchange over several communication channels. However, the data transmission network 23 may also be formed by a signalling network part of the telecommunication network 13 handling the communication data exchange between the communication clients 11, 12.

Although shown as separate networks, those skilled in the art will appreciate that the telecommunication network 13 and the data transmission network 23 may be an integral network, providing both communication data exchange between the communication clients 11, 12 and the exchange of media data file selection signals, media file metadata and control data with the application control server 18.

The system 10 further comprises a communication processing server 25, operatively connected 24, 26, 27 to the telecommunication network 13, the application control server 18 and the storage engine 14, respectively. The connection 24 is arranged for simultaneously presenting media file data by the communication processing server 25 to the first and second communication clients 11, 12 in the course of a communication data exchange 31, 32. The media data to presented is retrieved, from the storage engine 14, over the connection or interface 27, based on media control data exchanged between the application server 18 and the communication processing server 25 over the connection or interface 26.

In the embodiment shown, the application control server 18 operatively connects 29 to a database 28 for providing registration and authentication of communication clients 11, 12, amongst others for registering user preferences and services capabilities of communication clients and/or for cost charging and billing purposes of media data provided to the communication clients 11, 12. The application control server 18 may be arranged for provisioning registration and authentication of communication clients 11, 12, and for enabling processing of any of media data file related control data, metadata, and media data file selection signals, in the course of a communication data exchange between the first and second communication clients 11, 12 based on the registration data stored in the database 28.

Registration and authentication of communication clients 11, 12 may enable selection of media data files 15, 16, 17 from the storage engine 14 for originating communication clients only, that is communication clients by which a communication data exchange is started, for terminating clients only, that is communication clients receiving a data exchange, or for both originating and terminating communication clients, that is communication clients starting and receiving a communication data exchange, for example. It will be appreciated that in practical embodiments the database 28 may be integral with the storage engine 14.

To facilitate the exchange of media data file selection signals, media data file control data and media file metadata over an IP/TCP enabled data transmission network 23, in a further embodiment of the invention, one or both of the communication clients 11, 12 comprises dedicated media data application software, schematically indicated by reference numeral 30. This media data application software 30 is preferably arranged to provide a user interface by which a user of a communication client 11, 12 may select a desired media data file from the storage engine 14 to be presented during a communication data exchange in which the communication client 11, 12 is involved. The interface may comprise a simple text interface and/or a more versatile graphical, image based interface, presenting metadata of media data files available for selection to present in the course of a communication data exchange. The media data application software 30 may comprise a control menu for registration and authentication purposes and for generating control data in relation to the presentation of a media data file such as the point in time to start and/or stop the presentation of a media data file to the communication clients 11, 12, whether to play the media data file as background sound, etc.

The data exchange between the application control server 18 and any of the communication clients 11, 12 in the case of an IP/TCP enabled data transmission network 23, preferably complies to a Representational State Transfer, REST, architecture, and RESTFul HTTP/HTTPS communication channels 20, 21, 22. Those skilled in the art will appreciate that for the purpose of the invention other known data communication protocols may be used.

The media data application software 30, in an embodiment of the invention, may be arranged for analysing communication data exchanged between the communication clients 11, 12 to facilitate automatic presentation of a media data file based on the actual content of the data exchanged. That is, based on the content of the communication data exchanged, the application software 30 of a communication client 11, 12 automatically generates media data file selection signals and control signals, if appropriate, and transmits same to the application control server 18 for presentation of a selected media data file 15, 16, 17 to the communication clients 11, 12 in the course of the communication data exchange.

In an embodiment of the invention, in the case of a communication data exchange to be enriched with selected media data file content, the telecommunication network 13 and the communication processing server 25 are arranged to exchange, i.e. route, the communication data between the first and second communication clients 11, 12 over the connection 24. The communication processor 25 than inserts media data files selected by a communication client 11, 12 and retrieved from the storage engine 14, based on control data retrieved from the application control server 18, in the communication data exchange between the first and second communication clients 11, 12.

Instead of integrally routing the communication data exchange between the communication clients 11, 12 through the communication server 25, the telecommunication network 13 and the system 10 may be arranged to only process the communication data exchange between communication clients 11, 12 for the time that media data file content has to be presented to the communication clients 11, 12, i.e. on demand.

When routing the communication data exchange through the communication processing server 25, communication data analysis and automatic presentation of a media data file based on the actual content of the data exchanged may be performed on the system side 10, for example by the communication processing server 25 using a data content analysis software module 35, such as a commercially available Automatic Speech Recognition, ASR, software module in the case of analysing a speech communication data exchange.

The insertion of selected media data file content in an on-going communication data exchange between communication clients 11, 12 may be arranged, by the communication processing server 25, by mixing or multiplexing the communication data and media file data at the communication data channel, for example using existing conference call functionality, or by setting up an appropriate separate communication channel or data signalling between the communication clients 11, 12 for exchanging the media data file content to be simultaneously presented. The mixing or multiplexing solution is most practical for the presentation of sound files 15 in a conventional telephone call. Setting up a separate communication channel provides the possibility of simultaneously presenting at the displays of the telecommunication clients 11, 12 a video data file 16 or image data file 17, selected from the storage engine 14, in addition to a voice or telephony call communication data exchange, for example.

An operator of the telecommunication network 13 may decide to route each communication data exchange through the communication processing server 25 or only a communication data exchange between communication clients to use the service according to the invention.

The latter can be implemented, for example by implementing a network part of the solution that enables selective routing via the communication processing server only for traffic to/from clients that have relevant subscription provisioned in network databases. In the case of a PLMN, for example, depending on a chosen implementation model, the subscription may be stored within such entities as: a Home Location Register, HLR, a Flexible Number Register, FNR, a Number Portability Data Base, NPDB, an Intelligent Network Service Control Point, IN-SCP, etc. which are accessible to a switching entity or node or server of the telecommunication network 13 to which one or both communication clients 11, 12 are associated with.

In a preferred embodiment according to the invention, the storage engine 14, the application control server 18 and the communication processing server 25 are arranged for operating in accordance with an Internet protocol Multimedia Subsystem, IMS, communication platform.

In practice, IMS operates as an overlay network for an existing telecommunication network 13 such as a PSTN, GSM, ISDN, and/or data transmission network 23. That is, the communication data exchange between the communication clients 11, 12 and/or the media data file related data exchange between the communication clients 11, 12 and the application control server 18 is processed through the IMS. For the purpose of the invention, in a practical implementation thereof, the communication processing server 25 is arranged for operating as a Media Resource Function, MRF, of the IMS communication platform and as an Application Server, AS, operating in the system 10 or telecommunication network 13 for handling call related signalling traffic such as when anchoring a communication data exchange or call at setup. The MRF is a standardized functionality in IMS providing media related functions to manage and process media streams such as voice, video, text-to-speech, and real-time transcoding of multimedia data, by mixing media data file streams using multiparty conference functionality.

In a practical embodiment of the system according to the invention for operating in an IMS communication platform, for example, the communication processing server 25 is comprised of two separate parts or components 36, 37, as schematically indicated in FIG. 1 by a broken line. That is a media server part 37 handling the media traffic and arranged for operating in accordance with a Media Resource Function, MRF, and a call control server part 36, i.e. an Application Server, AS.

Figure 2:
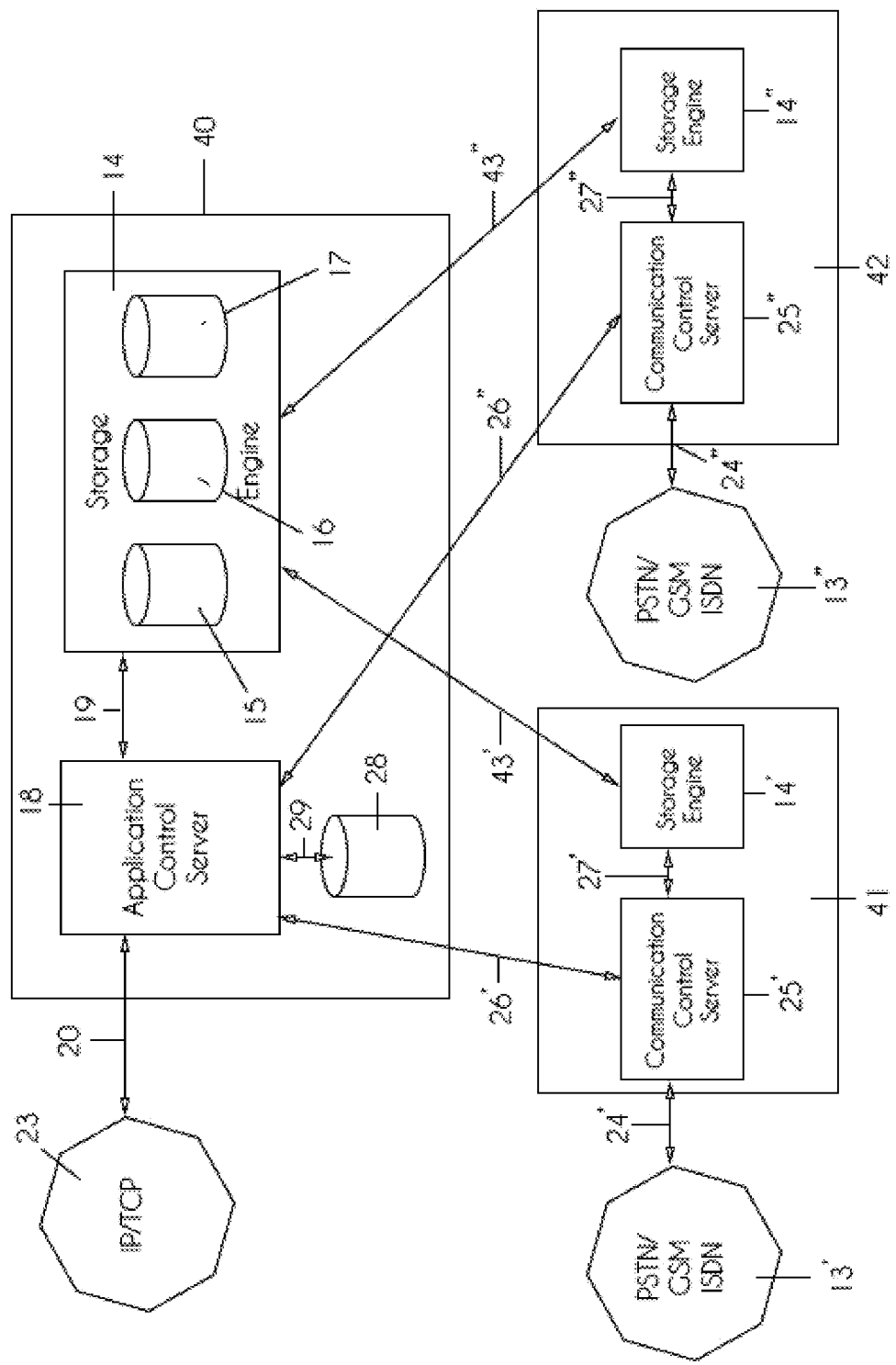
FIG. 2 is an example of a schematic high-level view showing part of an embodiment of the system according to FIG. 1, having a common application control server and storage engine and distributed communication processing servers and replicas of the common storage engine.

FIG. 2 shows an embodiment of the invention in which the application control server 18 and storage engine 14 are arranged as an entity or system 40 common or central for a plurality of different telecommunication networks 13', 13" or telecommunication network operators. To each telecommunication network 13', 13" a separate arrangement 41, 42 comprising a communication processing server 25', 25" and storage engine 14', 14" is associated and/or dedicated. The arrangements 41, 42 may be located with a particular telecommunication network 13', 13" or at the telecommunication network operator premises. Although not explicitly shown, those skilled in the art will appreciate that the telecommunication networks 13', 13" for communication purposes between communication clients may connect directly or via an overlayed IMS network, for example. Control data and media data file selection signals may be exchanged using Session Initiation Protocol, SIP, signalling, for example.

A distributed or local communication processing server 25', 25" operatively connects 24', 24" to the respective telecommunication network 13', 13" for simultaneously presenting media file data by the communication processing server 25', 25" to first and second communication clients 11, 12 in the course of a communication data exchange. The media data to be presented is retrieved, from the respective distributed or local storage engine 14', 14" over a respective connection or interface 27', 27" based on media control data exchanged between the application server 18 and the respective communication processing server 25', 25" over a connection or interface 26', 26".

The distributed or local storage engines 14', 14" comprise a replica of the media data files 15, 16, 17 stored at the common storage engine 14. The distributed or local storage engines 14', 14" operatively connect 43', 43" to the common storage engine 14 for the purpose of maintaining and renewing the content of the media data files and related metadata in each of the local storage engines 14', 14". The replication of storage engines 14, 14', 14" may be effected during off peak hours of a telecommunication network, for example at night, thereby avoiding use of scarce data transmission resources during busy hours.

The distributed storage engine structure shown in FIG. 2 helps to avoid delays in the presentation of media data files 15, 16, 17 by a transfer of retrieved media data file content from the central or common storage engine 14 to a decentralized or local communication processing server 25', 25". This to provide as much as possible presentation of selected media data file content to both communication clients 11, 12, simultaneously. It will be appreciated that the communication clients each may connect to a separate telecommunication network 13', 13" and that the data transmission network 23 may be common or separate for each communication client 11, 12.

Figure 3:
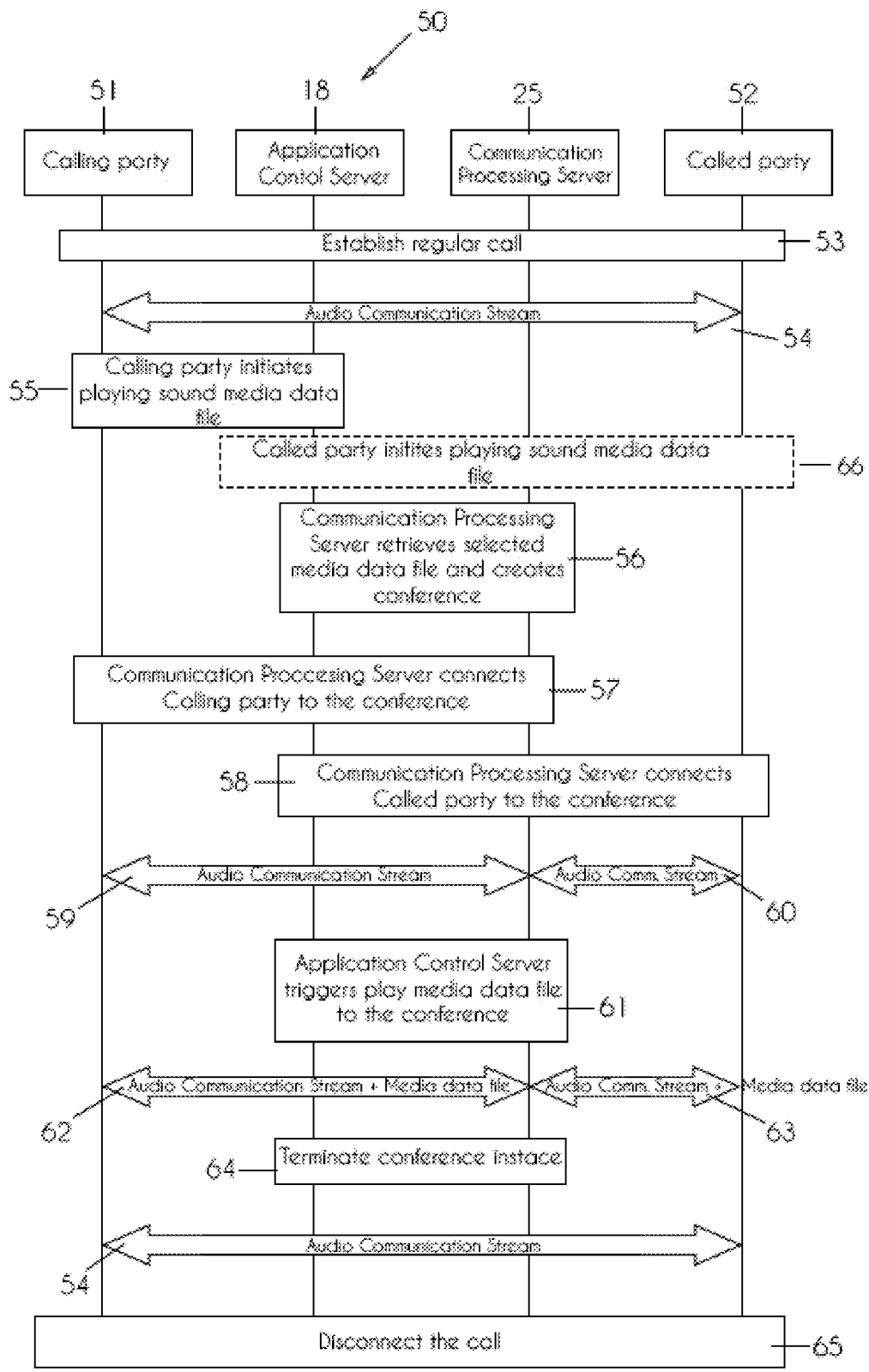
FIG. 3 shows an example of a signalling diagram for a communication data exchange between two communication clients in accordance with the principles of the invention.

FIG. 3 shows, by way of example and with reference to the system shown in FIG. 1, a signalling diagram 50 of an embodiment of the invention for a voice or speech communication data exchange between the two communication clients 11, 12 in accordance with the principles of the invention.

It is assumed that the communication client 11, being a calling party 51, establishes through the telecommunication network 13 a regular voice call or telephone call 53 with the communication client 12, being the called party 52. Once established, the calling 51 and called party 52 exchange an audio communication stream 53.

In the course of the audio communication stream 54, the calling party wishes to present to the called party 52 an audio media data file 15 from the storage engine 14. To this end, the calling party 51 initiates the play of a sound media data file by contacting 55 the application control server 18 via the data transmission network 23, for example. That is, the calling party 51 selects an appropriate audio media data file 15 and exchanges control data with the application server 18 when, i.e. at what point in time during the call, to play the selected audio media data file, for example.

Next, the application control server 18 contacts the communication processing server 25 for retrieving the selected audio media data file from the storage engine 14 and to create a conference call facility 56 for injecting the selected media data file into the audio communication stream between the calling 51 and called party 52.

The communication processing server 25 connects 57 the calling party 51 into the conference and connects 58 the called party 52 to the conference call. The audio communication stream 54 is now exchanged through the communication processing server 25, as indicated by reference numerals 59 and 60.

The application control server 18 then triggers 61 the communication processing server 25 to play the retrieved sound media data file into the conference 62, 63 to both the calling 51 and called party 52 simultaneously. For example at a point in time set by the calling party 51 when initiating 55 the play of the sound media data file.

Once the media data file has been played, the conference instance is terminated 64 by the communication processing server 25, for example triggered by the application server 18, such that the regular audio communication stream 53 between the parties 51, 52 is established and the call eventually may be terminated 65.

If enabled, in a further embodiment of the invention, the called party 52, in the course of the audio communication stream 54, may wish likewise to present to the calling party 51 an audio media data file 15 from the storage engine 14. To this end, the called party 52 initiates the play of a sound media data file by contacting 66 the application control server 18 via the data transmission network 23, for example, as indicated by broken lines. That is, the called party 52 selects an appropriate audio media data file 15 and exchanges control data with the application server 18 to play the selected audio media data file, for example.

Next, the application control server 18 contacts the communication processing server 25 for retrieving the selected audio media data file from the storage engine 14 and to create a conference call facility 56 for injecting the selected media data file into the audio communication stream 54 between the calling 51 and called party 52.

The communication processing server 25 connects the called party 52 and the calling party 51 into a conference call 57, 58 and the audio communication stream 54 is exchanged through the communication processing server 25, as indicated by reference numerals 59 and 60.

The application control server 18 then triggers 61 the communication processing server 25 to play the retrieved sound media data file into the conference 62, 63 to both the calling 51 and called party 52 simultaneously. For example at a point in time set by the calling party 51 when initiating 55 the play of the sound media data file.

Once the media data file has been played, the conference instance may be terminated 64 by the communication processing server 25, for example triggered by the application server 18, such that the regular audio communication stream 53 between the parties 51, 52 is established and the call eventually may be terminated 65.

In an embodiment of the invention, the presentation of a media data file may be continued to a communication client while the other communication client has been terminated from a communication data exchange. In another embodiment of the invention, a media data file may be communicated to an originating communication client even before a data communication exchange is established. Both embodiments and the presentation of media data files during a communication data exchange are covered by the terminology "in the course of a communication data exchange" used in the above description and the appended claims.

In practical implementations, the invention provides for selective routing of a communication data exchange originated by a communication client being a subscriber of the media file presentation service and/or communication terminated by a subscriber of the service towards the call control server part, such as an application server, AS, of the communication processing server implemented in an IMS based communication platform.

Figure 4:
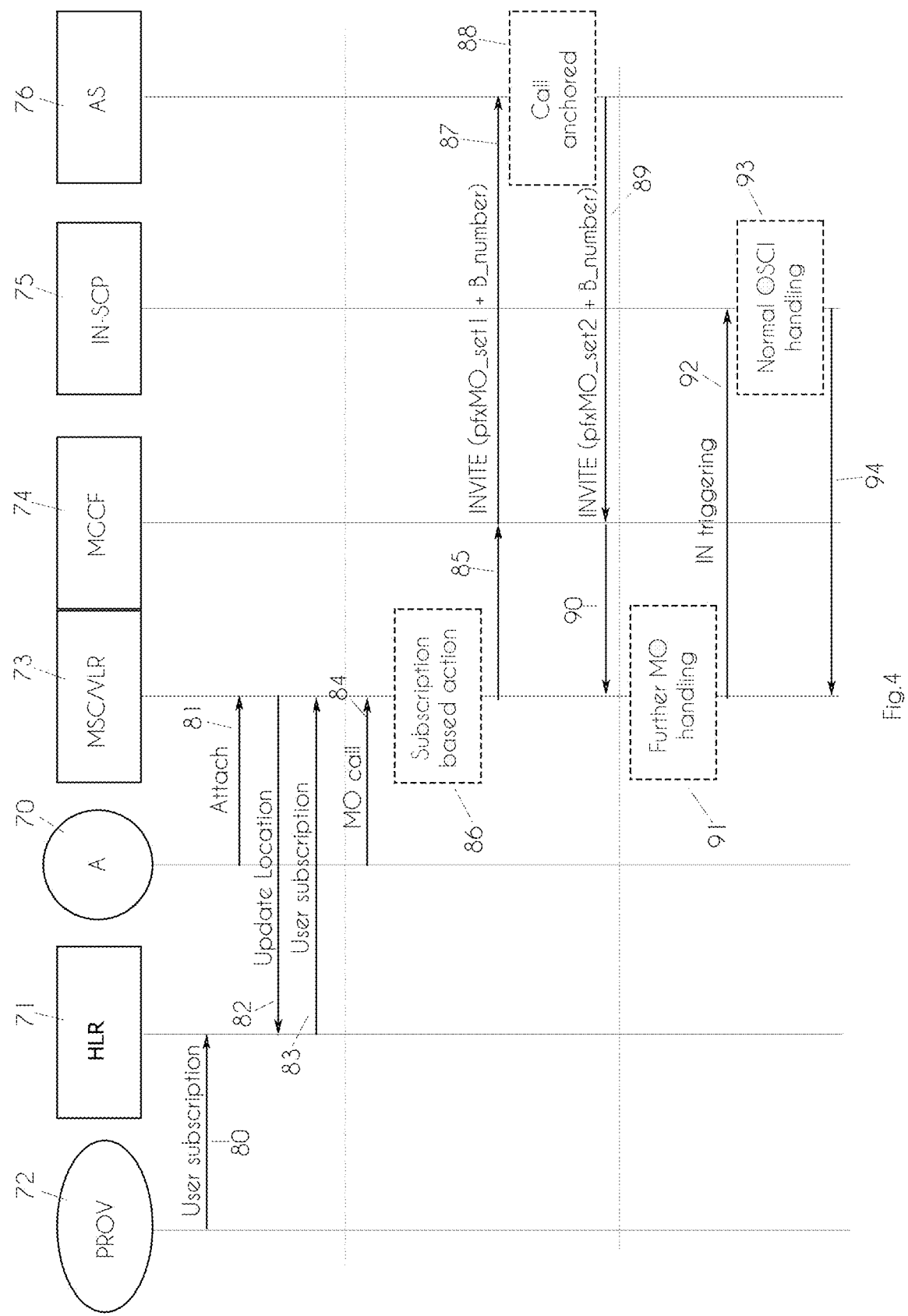
FIG. 4, FIG. 5 and FIG. 6 show examples of signalling exchange in a mobile Core Network enabling selective rerouting of communication data exchange, i.e. calls, towards an application server forming the call control server part of the communication processing server and anchoring the calls there, to enable execution of media data application during an ongoing a communication data exchange by the application server logic.
Figure 5:
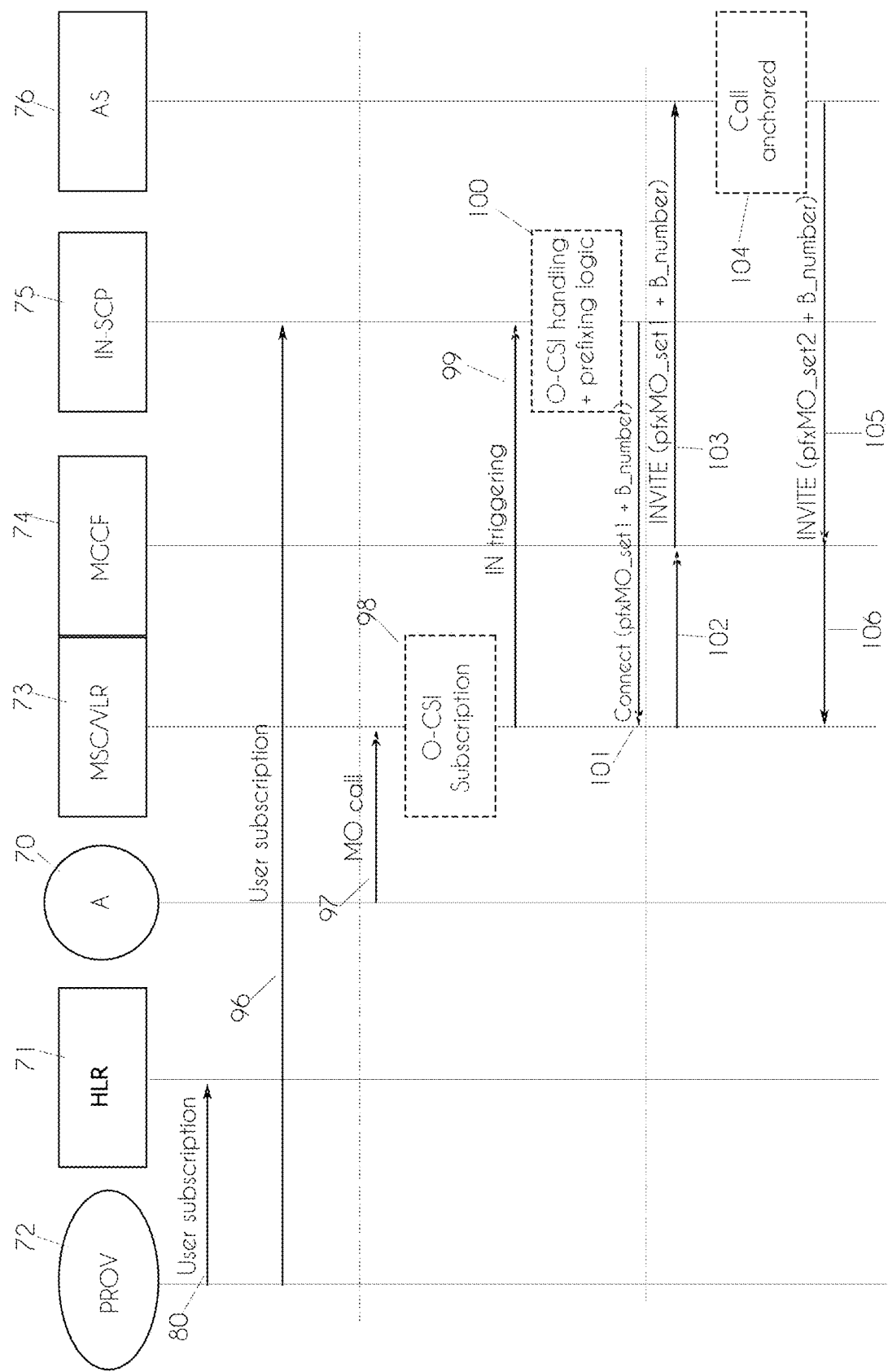
Figure 6:
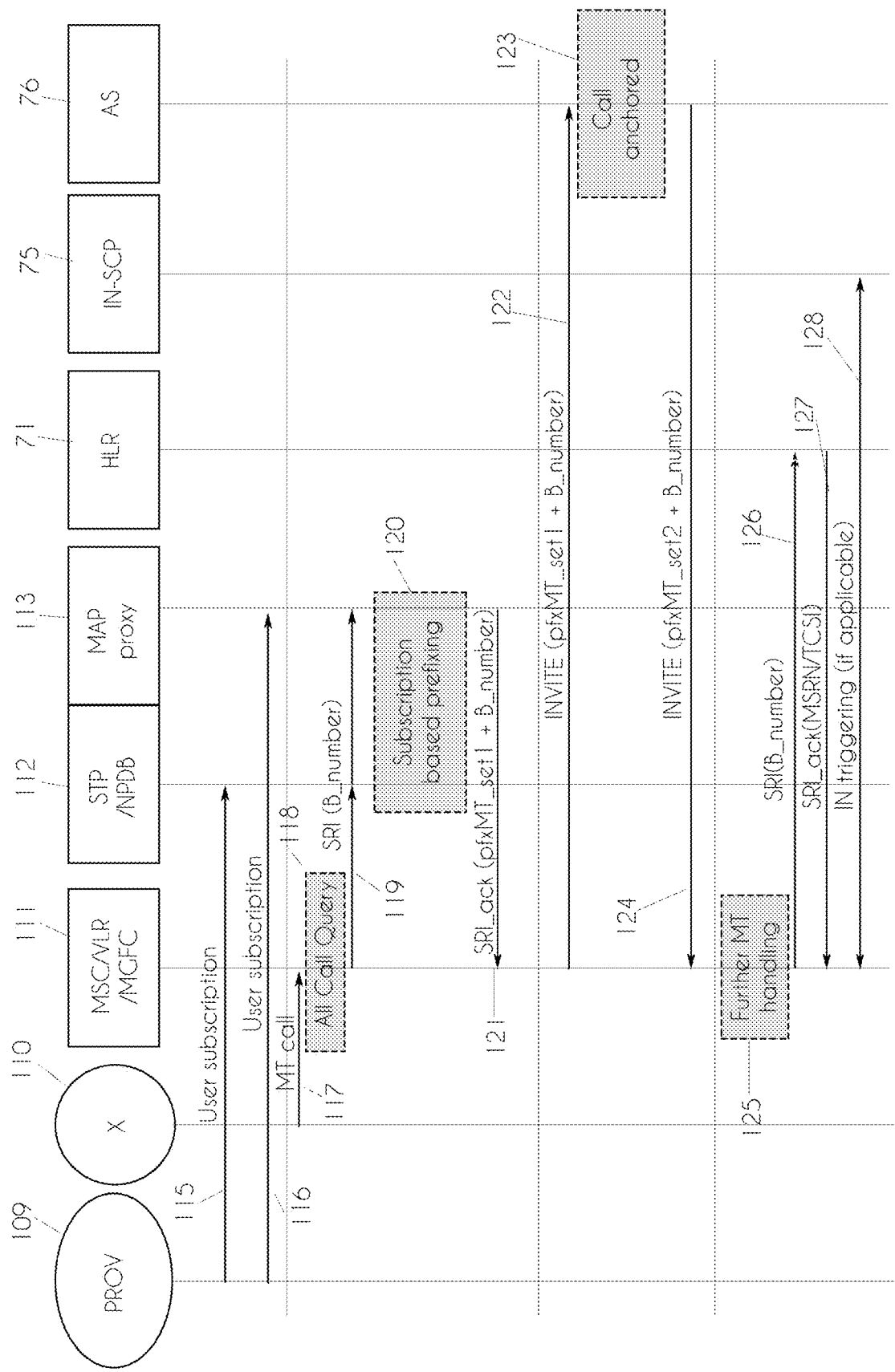

In FIGS. 4, 5 and 6 preferred methods are presented that enable a PLMN to provide selective routing of calls towards the AS, while maintaining existing services for a mobile subscriber or User Equipment, UE, or in short mobile. The call flow descriptions of FIGS. 4, 5 and 6 assume the presentation of a sound or audio data file, in short sound injection, to the communication clients. In the call flow diagrams of FIGS. 4, 5, and 6 time is running from the top to the bottom, and the steps indicated are subsequently applied in time.

In FIG. 4, a communication call routing method is presented for a Mobile Switching Center, MSC, based Mobile Originating, MO, call. In this MSC based method, the MSC reroutes the MO call to the AS based on a dedicated Originating CAMEL Subscription Information, O-CSI, subscription derived from the Home Location Register, HLR. This requires specific MSC configuration and hence is applicable to MO and Call Forwarding, CF, calls originated in Home Public Land Mobile Network, HPLMN, only (not available in roaming) Dedicated service key values and corresponding B-number prefixes are used for subscription type differentiation and call rerouting. Intelligent Network, IN, triggering related to other services, if required for a given subscription type, is performed after the call returns from the AS to the MSC, based on the assigned B-number prefixes.

Although in this example implementation O-CSI is used, the approach is generic and other subscription elements, such as Intelligent Network Application Protocol, INAP, subscription, Switching System, SS, code, etc. could also be used depending on availability of supporting functionality in HLR and MSC. Also the MO and CF case discrimination could be done on MSC/Visitor Location Register, VLR, level.

In the call flow of FIG. 4, the sound injection subscriber 70, or A-party, is provisioned 72 in the HLR 71 with a specific O-CSI subscription 80, which includes:
  a specific service key value from SK_set;
  is sent to HPLMN VLRs only (based on on adequate HLR functionality);
  overrides any existing O-CSI subscription used in HPLMN;
  allows different service key values within Service Key SK_set1 to be used to differentiate subscription types for later handling, such as IN triggered versus non-triggered subscriber, to indicate IN platform and/or service, to indicate AS platform.

In an attach request 81, the subscriber or communication client 70 contacts the MSC/VLR 73 resulting in a location update 82 from the MSC/VLR 73 to the HLR 71 and the provisioning 83 of user subscription information of the subscriber 70 from the HLR 71 to the MSC/VLR 73.

The HPLMN MSC/VLR 73 redirects 85 an incoming MO call 84 to the AS 76 via IMS Media Gateway Control Function, MGCF, 74 based on the subscription 86. The MSC in HPLMN has the capability to analyse the SK value for O-CSI subscribers, by existing functionality or market adaptation. It is noted that AS 76 and AS 36 in FIG. 1 represent the same server.

For service keys from SK_set1, special handling is configured: the O-CSI trigger is suppressed, the called party or B-number is prefixed with a corresponding prefix, pfx, from pfxMO_set1 and routed via MGCF to AS, i.e. INVITE (pfxMO_set1+B_number) SIP message 87.

Different prefix values within pfxMO_set1 encode the subscription type indicated by the service key and which is needed for later handling. Emergency numbers may be excluded from this handling and served directly in MSC. Other specific numbers, e.g. Hotlines, may be also excluded from the handling to guarantee availability in case of AS failure.

The AS 76 anchors the call 88, modifies the prefix and routes it back to MSC 73 via MGCF 74, i.e. signalling 89, 90. Prefix from pfx_set1 enables AS 76 to distinguish the MO case, additionally history info field enables it to distinguish a CF case. AS 76 may modify the received prefix from pfxMO_set1 according to a predefined rule to corresponding prefix from pfxMO_set2 and routes the call back to MGCF/MSC 74/73, i.e. INVITE(pfxMO_set2+B_number) 89. AS 76 has now control over the MO leg of the call and may execute the sound injection logic as required.

The MSC 73 performs further call handling 91 based on prefix from pfxMO_set2 received from AS 76, i.e. "postpaid" handling for prefix values indicating a non-triggered subscription normal MO call handling is applied, and "prepaid" retriggering for prefix values indicating a triggered subscription. A number based IN triggering 92 is performed to the relevant IN-SCP 75. This may be done with DP3 or DP2 setting depending on SCP requirements and MSC capabilities. Further handling 93, 94 is the same as for the original O-CSI subscription.

In FIG. 5 SCP based MO method is presented. In SCP based method the MSC initiates an O-CSI dialogue to the IN-SCP as defined by a HLR subscription. The prefixing logic is done by the IN-SCP according to subscription type, which may be based on service provisioning in IN-SCP or on a specific O-CSI parameter received by IN-SCP such as a service key. The MSC reroutes the call to the AS based on B-number prefix inserted by the IN-SCP. O-CSI triggering related to other services, if required for a given subscription type, is done within this first O-CSI dialogue—i.e. before call redirection to the AS. That is retriggering after AS anchoring is not required, as has been the case in the MSC based method. This solution may be applied in HPLMN but also in a Visited Public Land Mobile Network, VPLMN, with active CAMEL Application Part, CAP, roaming. In this case CAP rerouting to HPLMN needs to be applied.

Call flow description FIG. 5: the sound injection subscriber or communication client 70 is provisioned 72 in HLR 71 with an O-CSI subscription 80 and IN-SCP provisioning 96 in the IN-SCP 75. For "non-triggered subscribers", that do not have other O-CSI based services, this subscription is added specifically for the present sound injection service, to perform prefixing logic. For "triggered subscribers", i.e. that have other O-CSI services, the existing subscription is maintained, only the prefixing logic is added in IN-SCP 75 for respective subscription types. If IN-SCP 75 provisioning for the service needs to be avoided, the same O-CSI parameter, e.g. a service key from a certain SK_set1, may be modified in HLR 71 to indicate sound injection subscription to the IN-SCP 75.

For active roaming, a separate O-CSI subscription would normally be used and additional call rerouting logic is needed in IN-SCP 75 and CS Core in order to reroute such calls to the AS 76. Rerouting to HPLMN would be done based on temporary E.164 numbers assigned by the IN-SCP, since prefixes from pfxMO_set1 would not be recognized by the VPLMN.

In an attach request, the subscriber or communication client 70 contacts the MSC/VLR 73 resulting in a location update from the MSC/VLR 73 to the HLR 71 and the provisioning of user subscription information of the subscriber 70 from the HLR 71 to the MSC/VLR 73. See FIG. 4, signalling 81-83.

Based on the O-CSI subscription 98, the HPLMN MSC/VLR 73 triggers by IN triggering 99 the IN-SCP 75 following an incoming MO call 97. IN-SCP 75, i.e. O-CSI handling and prefixing logic 100 thereof, performs the B-number prefixing, and forward same back to the MSC/VLR 73 by a Connect(pfxMO_set1+B_number) message 101 and MSC/VLR 73 reroutes the call to AS 76 in an INVITE(pfxMO_set1+B_number) signalling message 101 to the AS 76 via MGCF 74, i.e. signalling 102.

The assignment of prefixes is done based on subscription information stored in IN-SCP 75 or based on a specific O-CSI parameter, e.g. service key from SK_set1, provisioned in HLR 75 and received by IN-SCP 75 within the trigger. Different prefix values within pfxMO_set1 may be used to differentiate subscription types for later handling, e.g. AS platform.

Emergency numbers and other number such as Hotline may be excluded from this handling and served directly in MSC 73, possibly even before O-CSI invocation.

The AS 75 anchors the call 104, modifies the prefix and routes it back to MSC 73 in an INVITE(pfxMO_set2+B_number) signalling message 105 to the MGCF 74 and from the MGCF 74 in a signalling message 106 to the MSC 73.

Prefix from pfx_set1 enables AS 76 to distinguish the MO case, an additionally history info field enables it to distinguish the CF case also. The AS 76 may modify the received prefix from pfxMO_set1 according to a predefined rule to corresponding prefix from pfxMO_set2 and routes the call back to MGCF/MSC 74/73. The AS 76 has now control over the MO leg of the call and may execute the sound injection logic as required. The MSC 73 performs further call handling based on prefix from pfxMO_set2 received from AS 76 and normal further call handling is applied.

An alternative version of IN-SCP based MO method may be also considered in which a separate IN-SCP or IN service broker logic or Signalling Transfer Point, STP, with adequate IN capabilities is used, which is able to handle call prefixing logic. In this case the sound injection subscriber is also assigned a specific O-CSI subscription, which is pointing to the IN-SCP. The IN-SCP is able to apply prefixing logic according to the sound injection subscription assigned to the A-number and return a Connect message back to the MSC. Similarly as in MSC based MO method, the prefixes for certain pfxMO_set1 applied by the IN-SCP may encode information required for routing towards the AS and for further handling, which may include IN retriggering. Hence, in this method O-CSI related SCP retriggering, if applicable, is done after anchoring the call in the AS.

In FIG. 6 a Number Portability Data Base, NPDB, based Mobile Terminating, MT, routing method is presented. In the NPDB based method, the MSC performs Send Routing Information, SRI, interrogation as usually for the MT call and reroutes the call to the AS based on a specific prefix received in the SRI_ack in the Mobile Subscriber Roaming Number, MSRN, field. Dedicated prefixes may be used for subscription type differentiation and target HLR identification, if required. The MT subscription information may be located in an NPDB/Mobility Application Part, MAP, proxy server, however it could be implemented also in other entities or servers, e.g. HLR, FNR, etc. Since the initial interrogation provides the prefix for routing to the AS, after anchoring the call in the AS, the interrogation needs to be repeated in order to finalize the normal MT call handling, including any CF and Terminating CAMEL Subscription Information, T-CSI, cases that may apply. Of course adequate measures need to be applied to avoid scenario looping in this case.

Call flow description FIG. 6: the terminating sound injection subscriber, i.e. B-subscriber or communication client X 110 is provisioned 109 in NPDB/MAPproxy 112/113 with a specific user subscription 115, 116. This B-number subscription in NPDB 112 indicates that the interrogation should be relayed to MAP proxy 113.

B-number subscription in MAP proxy indicates that for SRI a specific prefix from pfxMT_set1 should be returned in SRI_ack to MSC (MAPproxy performing MATF) and other MAP messages should be relayed to the proper HLR (MAP proxy performing SRF). The prefix may encode the service type, IUS platform and/or HLR identity. In an alternative solution this functionality may be implemented entirely in the NPDB, or in HLR, i.e. these elements would contain relevant subscription information and would perform MATF with adequate prefixing.

The MSC 111 in an All Call Query 118 and SRI(B_number) signalling message 119 retrieves a prefix value prefMT_set1 received from MAP proxy 113, based on the particular subscription of the B_number 120, in an SRI_ack (pfxMT_set1+B_number) signalling 121. Next, the MSC 111 reroutes the call to AS 76 with an INVITE(pfxMT_set1+B_number) message 122 and the call is anchored 123 at the AS 76.

The prefix from pfxMT_set1 enables the AS 76 to distinguish the MT scenario. That is, the AS may modify the received prefix from pfxMT_set1 according to a predefined rule to corresponding prefix from pfxMT_set2 and routes it back to MSC 111 with an INVITE(pfxMT_set2+B_number) message 124. AS 76 has now control over the MT leg of the call and may execute the sound injection logic as required.

The MSC 111 performs further MT call handling 125 based on prefix from pfxMT_set2 received from AS 76. The MSC 111 repeats the SRI interrogation towards the HLR 71, i.e. SRI(B_number) signalling 126 in order to complete the normal MT handling. This time, based on HLR information encoded in prefix from pfxMT_set2, i.e. SRI_ack(MSRN/T-CSI) signalling 127, the MSC 111 sends the interrogation directly to the HLR 71. The further call handling may require IN triggering 128 towards the IN-SCP 75, for example. The NPDB 112 is not queried, therefore there is no looping and normal MT handling may be completed, including any CF or T-CSI scenarios that may apply.

In an alternative solution based on the HLR, the second interrogation would need to carry a specific indication, e.g. specific TT value, that would suppress the prefixing logic in HLR and lead to normal MT handling. As an alternative an IN-SCP based MT method may be considered. In such an IN-SCP based MT method, the MSC performs SRI interrogation as normally and receives a T-CSI subscription from the HLR. The MSC reroutes the call to the AS based on a specific prefix received in a Connect message from the IN-SCP. Adequate logic and subscription needs to be implemented on SCP side to provide the rerouting prefix in response and to enable seamless interaction with other T-CSI based services that may be in place.

In FIG. 6, for the purpose of the invention, the MSC may also be replaced by a VLR or Media Gateway Control Function, MGCF, and the NPDB functionality may be applied in an STP.

The present invention is not limited to the embodiments disclosed above, and can be modified and enhanced by those skilled in the art beyond the scope of the present invention as disclosed in the appended claims without having to apply inventive skills.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A system for presenting media data to a first communication client and a second communication client during an ongoing communication data exchange between the first communication client and the second communication client in a telecommunication network, the system comprising:
   a storage engine, configured to store a plurality of media data files;
   an application control server, configured to receive media data file selection signals from at least one of the first communication client and the second communication client during the ongoing communication data exchange between the first communication client and the second communication client, and to select media data files from the storage engine based on the received media data file section signals; and
   a communication processing server, configured to retrieve the selected media data files from the storage engine and to supplement the ongoing communication data exchange between the first communication client and the second communication client with the retrieved media data files by simultaneously presenting the retrieved media data files at the first communication client and the second communication client while the ongoing communication data exchange between the first communication client and the second communication client is being routed through the communication processing server.

2. The system according to claim 1, wherein the application control server is configured to exchange media data file related control data and metadata, including the media data file selection signals, with at least one of the first communication client and the second communication client using an Internet Protocol (IP) enabled communication channel.

3. The system according to claim 1, wherein the application control server is configured to exchange media data file related control data and metadata, including the media data file selection signals, with a dedicated media data application of a communication client, wherein the media data application is configured to generate media data file selection signals from an analysis of data exchanged during the ongoing communication data exchange.

4. The system according to claim 1, wherein the application control server and the storage engine are common for a plurality of different telecommunication networks or telecommunication network operators, and the communication processing server comprises a plurality of communication servers arranged with and dedicated to different telecommunication networks or telecommunication network operator premises.

5. The system according to claim 4, wherein a telecommunication network or telecommunication network operator comprises a storage engine arranged with and dedicated to the telecommunication network or telecommunication network operator premises and comprising a replica of the commonly provided storage engine, wherein the commonly provided storage engine and dedicated storage engines are configured to automatically replicate media data files.

6. The system according to claim 1, wherein the media data files stored in the storage engine are categorized, and the application control server is configured to select the media data files from the storage engine based on the received media data file section signals in accordance with a category of the media data files.

7. The system according to claim 1, configured to provision registration and authentication of the first communication client and the second communication client, for enabling processing of any of media data file related control data and metadata, including the media data file selection signals, during the ongoing communication data exchange between the first communication client and the second communication client if at least one of the first communication client and the second communication client is a registered and authenticated communication client,
wherein registration and authentication data of communication clients is stored in a register or storage of the telecommunication system or in the telecommunication network as a dedicated subscription accessible by a switching entity, node or server of the telecommunication network, and
wherein the switching entity, node or server is configured to use the subscription data for routing the ongoing communication data exchange between the first communication client and the second communication client through the communication processing server.

8. The system according to claim 1, wherein the storage engine, application control server and communication processing server are configured to operate in accordance with an Internet protocol Multimedia Subsystem (IMS) communication platform, wherein the communication processing server comprises a media server part handling media traffic and configured to operate in accordance with a Media Resource Function (MRF) and a call control server part, wherein the call control server part is an Application Server (AS) configured to handle call related signaling traffic.

9. A method of presenting media data to a first communication client and a second communication client during an ongoing communication data exchange between the first communication client and the second communication client in a telecommunication network, the method comprising the steps of:
receiving, by an application control server, media data file selection signals from at least one of the first communication client and the second communication client in the course of the ongoing communication data exchange;
selecting, by the application control server, media data files from a storage engine based on the received media data file section signals;
retrieving, by a communication processing server, the selected media data files from the storage engine; and
supplementing, by the communication processing server, the ongoing communication data exchange between the first communication client and the second communication client with the retrieved media data files by simultaneously presenting the retrieved media data files at the first communication client and the second communication client while the ongoing communication data exchange between the first communication client and the second communication client is being routed through the communication processing server.

10. The method according to claim 9, wherein the ongoing communication data exchange between the first communication client and the second communication client is a voice telephone call, and wherein the media data are audio data.

11. One or more non-transitory, computer-readable media having computer-executable instructions for presenting media data to a first communication client and a second communication client during an ongoing communication data exchange between the first communication client and the second communication client in a telecommunication network, the computer-executable instructions, when executed, facilitating performance of the following:
receiving, by an application control server, media data file selection signals from at least one of the first communication client and the second communication client in the course of the ongoing communication data exchange;
selecting, by the application control server, media data files from a storage engine based on the received media data file section signals;
retrieving, by a communication processing server, the selected media data files from the storage engine; and
supplementing, by the communication processing server, the ongoing communication data exchange between the first communication client and the second communication client with the retrieved media data files by simultaneously presenting the retrieved media data files at the first communication client and the second communication client while the ongoing communication data exchange is being routed through the communication processing server.

* * * * *